(12) United States Patent
Hastie

(10) Patent No.: US 6,551,110 B1
(45) Date of Patent: Apr. 22, 2003

(54) VISUAL EDUCATIONAL DEVICE FOR TEACHING LITERACY

(76) Inventor: Patricia Catherine Hastie, MS 216, Innisfail, Queensland (AU), 4860

( * ) Notice: Subject to any disclaimer, the term of this patent is extended or adjusted under 35 U.S.C. 154(b) by 0 days.

(21) Appl. No.: 09/926,782

(22) PCT Filed: Jun. 20, 2000

(86) PCT No.: PCT/AU00/00690

§ 371 (c)(1), (2), (4) Date: Dec. 19, 2001

(87) PCT Pub. No.: WO00/79503

PCT Pub. Date: Dec. 28, 2000

(30) Foreign Application Priority Data

Jun. 21, 1999 (AU) .............................. 35784/99

(51) Int. Cl.[7] .............................. G09B 1/28; G09B 19/00
(52) U.S. Cl. ....................... 434/365; 434/170; 434/171; 434/172; 434/178; 434/203; 434/175
(58) Field of Search .................... 434/167, 171, 434/172, 175, 178, 365, 159, 160, 161, 170, 174, 203

(56) References Cited

U.S. PATENT DOCUMENTS

| 541,787 | A | * | 6/1895 | Hegewald et al. | .......... 434/192 |
| 580,516 | A | * | 4/1897 | Andrew | ...................... 434/203 |
| 660,255 | A | * | 10/1900 | Kingma | ...................... 434/178 |
| 1,028,212 | A | * | 6/1912 | Hegewald | .................... 434/203 |
| 1,280,930 | A | * | 10/1918 | Wolfe | .......................... 235/127 |
| 1,528,049 | A | * | 3/1925 | Fletscher | ..................... 434/203 |
| 2,857,686 | A | * | 10/1958 | Blake | ........................ 235/123 |
| 3,419,972 | A | * | 1/1969 | Kitzinger | ..................... 273/110 |
| 4,204,343 | A | * | 5/1980 | Brooks | ........................ 434/172 |
| 4,515,566 | A |   | 5/1985 | Sprague |  |
| 5,205,747 | A | * | 4/1993 | Tan | .............................. 434/203 |
| 5,725,380 | A | * | 3/1998 | Kennelly | ..................... 434/192 |
| 5,788,503 | A | * | 8/1998 | Shapiro et al. | ............. 434/167 |

FOREIGN PATENT DOCUMENTS

| CA | 2122627 | 7/1994 |
| DE | 3130114 | 2/1983 |
| WO | WO 9512189 | 5/1995 |

* cited by examiner

Primary Examiner—Derris H. Banks
Assistant Examiner—Dmitry Suhol
(74) Attorney, Agent, or Firm—Hoffman, Wasson & Gitler, PC

(57) ABSTRACT

An educational device (11) for visually modeling words or numerals. The device including a plurality of inverted U-shaped rods (15) and a plurality of balls (17), each ball (17) being movable between a non display position and a display position. When the device is used to represent a word, the number of rods (15) having a ball in the display position corresponds to the number of phonemes in the word and the number of balls (17) or a respective rod (15) represents the number of letters in a respective phoneme. When the device visually represents a number, each rod having a ball in the display position represents a unit from which the number is formed, and the number of balls in a respective display position can represent the relative size of a respective unit.

14 Claims, 3 Drawing Sheets

VISUAL EDUCATIONAL DEVICE FOR TEACHING LITERACY

THIS INVENTION relates to an educational device and method which can be used to visually represent word sounds and/or numerical values.

BACKGROUND ART

When people are learning to read and write, it is necessary for them to be able to relate the letters from which a word is spelt to the pronunciation of the word. When attempting to spell or to pronounce a new word, a student typically breaks the word into the different syllables and phenomes from which the word is made.

Visual representation of the component sounds of a word has been used to assist in literacy teaching. Examples of these are cards representing different syllables. A number of cards can be used to construct a word. However, large numbers of cards are required. Should one or more key cards representing common sounds be lost, the card set is rendered virtually useless.

Visual representation has also been used as an aid to teaching numeracy. An example of a known device for teaching numeracy are number boards in which numbers from 1 to 100 are represented in a 10×10 array.

A difficulty with the earlier methods and devices for visual display is that they tend to be complicated and difficult to use. In many cases, they are designed for use only by an instructor and are unsuitable for "hands on" use. Often, it is difficult to hold a student's attention, and in particular, that of a young child, with such devices.

It is therefore an object of the present invention to provide an educational method and device which may at least partially overcome the above disadvantages or provide the public with a useful choice.

SUMMARY OF THE INVENTION

According to a first broad form of the invention, there is provided an educational device for visually modeling words or numerals, the device including a plurality of display zones and a plurality of icons, each icon being moveable between a non display position and a display zone, whereby when the device is used to represent a word, the number of display zones having an icon therein corresponds to the number of phonemes in the word and the number of icons in a respective display zone represents the number of letters in a respective phoneme and when the device visually represents a number, each display zone having an icon therein represents a unit from which the number is formed, and the number of icons in a respective display zone can represent the relative size of a respective unit.

The device of the present invention includes a plurality of display zones. The number of display zones is not critical and may be selected according to, for example, the complexity of the words to be taught. As the device includes a display zone for each phenome, a device having a large number of display zones can be used to represent complex words or phrases. A device of this type can be used for more advanced students. Beginning readers which may be learning only simple words may use a device having a smaller number of display zones.

Typically, a display zone can display from zero to 10 icons. Generally, only those zones displaying an icon represent a phoneme. In this way a device having for example, ten display zones can be used to represent words of between 1 and 10 phonemes. Alternatively, the device can represent two or more words in which the display zones having zero icons can represent the spacing between words.

The icons are moveable between a display zone and a non display position. Typically the icons are three dimensional bodies which can be manually moved between positions. Typically the icons are of a size and shape which are attractive to children. Typically, the display zone is formed from a vertical rod, upon which icons may be slidably mounted. In this way, the icons can slide along the rod between the display and non display positions. In one form of the invention, the device may include a series of spikes upon which the icons can be inserted and removed.

In a preferred form of the invention, each display zone has a storage zone associated therewith such that icons may readily be transferred between the display and storage zones. An example of such an arrangement is where the display zone includes an inverted U shaped rod having a dividing partition located between the two arms of the rod. The storage position may be on the reverse side of the dividing partition.

Some words may also include silent letters and/or punctuation marks. In a preferred form of the invention, the device further includes a second set of display zones which can be used to visually represent the silent features of a word. Typically, the device includes the phenome display zones in an alternating arrangement with the silent display zones. Icons which can represent a silent letter or a particular punctuation mark can be placed within the silent display zones as necessary.

One or more phonemes can be linked to form syllables. In a further preferred embodiment of the invention, the device further includes means for visually linking those groups of phonemes which form the syllables of a word.

In a further form of the invention, the device further includes means by which the letters or numerals represented by a respective icon can be written adjacent a respective display zone. Suitably, the device may includes a writing surface mounted beneath the display zone to enable the words or numbers represented thereon to be written in conventional form. Typically, the writing surface is a blackboard or whiteboard mounted beneath the display zone. Alternatively, the letters may be in a solid form, such as magnets or felt and may be removably adhered to a corresponding surface located below the display zone.

Alternatively, the device may be represented on a video display and the icons can be manipulated by electronic control.

According to a further broad form of the invention there is provided a method of modeling words, the method including breaking a word into the phonemes from which the word is formed, visually representing each phonemes as a discrete collection of at least one icon, whereby the number of icons in each collection corresponds to the number of letters in each phoneme.

DETAILED DESCRIPTION OF THE DRAWINGS

Figure 1:
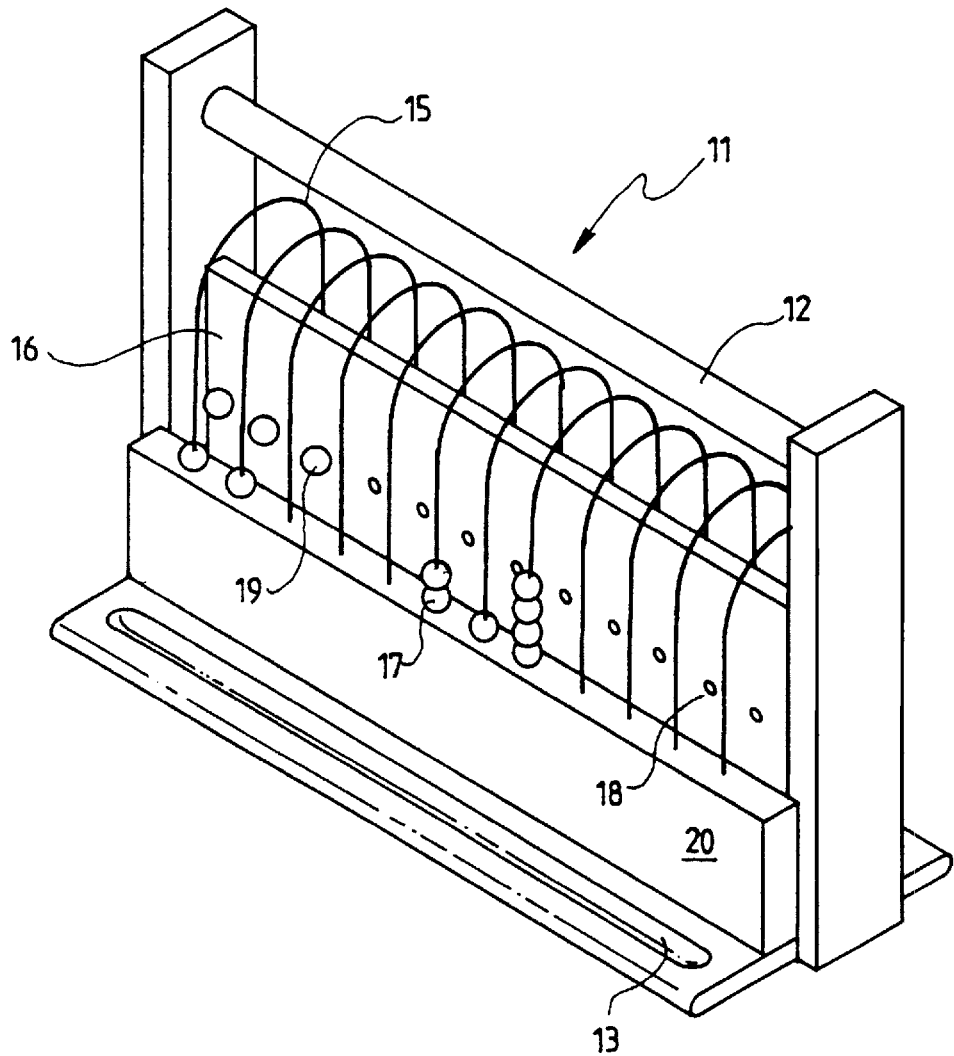
FIG. 1 is a perspective view of a preferred device of the present invention.

FIG. 1 illustrates a preferred device 11 of the present invention. The device includes a frame and a carry handle 12. At the base of the device is a recess 13 for holding pens or pencils. The device has a series of parallel of inverted U shaped rods 15. The opposing arms of the rods 15 are separated by a screen 16. Each rod 15 has a number of balls 17 slidably mounted thereon. The balls are moveable between a hidden storage position behind the screen 16 and a display position in front of the screen. Alternating rods have balls 17 of alternating colors mounted thereon.

When the device is used to represent a word, each rod represents a phoneme. Each ball 15 on a rod represents a letter of the phoneme.

The screen 16 also includes a number of apertures 18 which alternate between the rods 15. A second set of balls 19 which have a projecting pin can be mounted to the screen via these apertures by frictional engagement between the pin and the apertures 18. This second set of balls are of a contrasting color to balls 17. Some balls 19 are unmarked, whereas others have visual representations of punctuation marks or decimal points.

The device further includes a whiteboard 20 located below the base of the rods 15. The words or numbers to be represented can be written on the whiteboard as shown in the figures.

Figure 2:
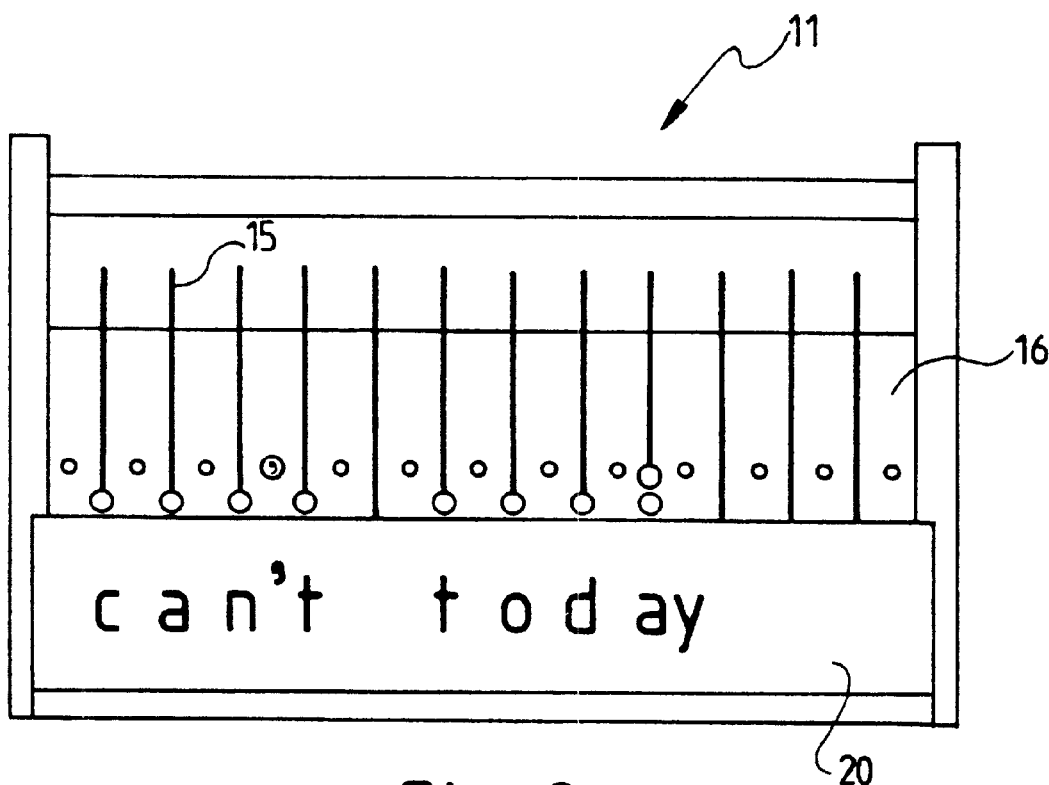
FIG. 2 is a front view of the device of FIG. 1 in which the words "CAN'T TODAY" has been modeled.
Figure 3:
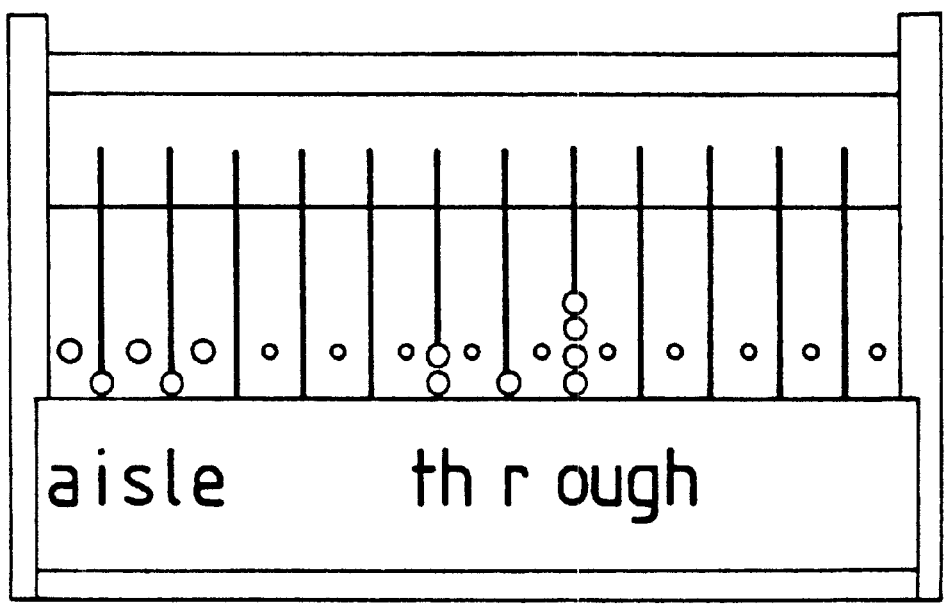

FIG. 2 illustrates the device of FIG. 1 in use and which has been manipulated to display the words "CAN'T" and "TODAY". Each phenome, C; A; N and T is represented by a different rod 15. As each phenome only has a single letter, only a single ball is in the display position. The remaining unused balls are located behind screen 16. In the word "TODAY", the phenomes T; O and D are each represented by a single ball. The phenome AY, having two letters is represented by two balls.

Figure 3:
FIG. 3 represents the device of FIG. 1 in which the two words "AISLE" and "THROUGH" have been represented.

In FIG. 3, the device illustrates the word "AISLE". "AISLE" has only two phenomes which are again represented by single balls on respective rods. The word "AISLE" also includes three silent letters. The silent letters are represented by the balls of contrasting color which have been mounted in the apertures. It can be seen that it is readily apparent that the word "AISLE" has only two phenomes and the remaining letters are silent.

FIG. 3 also illustrates how the word "THROUGH" can be represented to show that there are three phenomes, the phenomes having two, one and four letters respectively.

Figure 4:
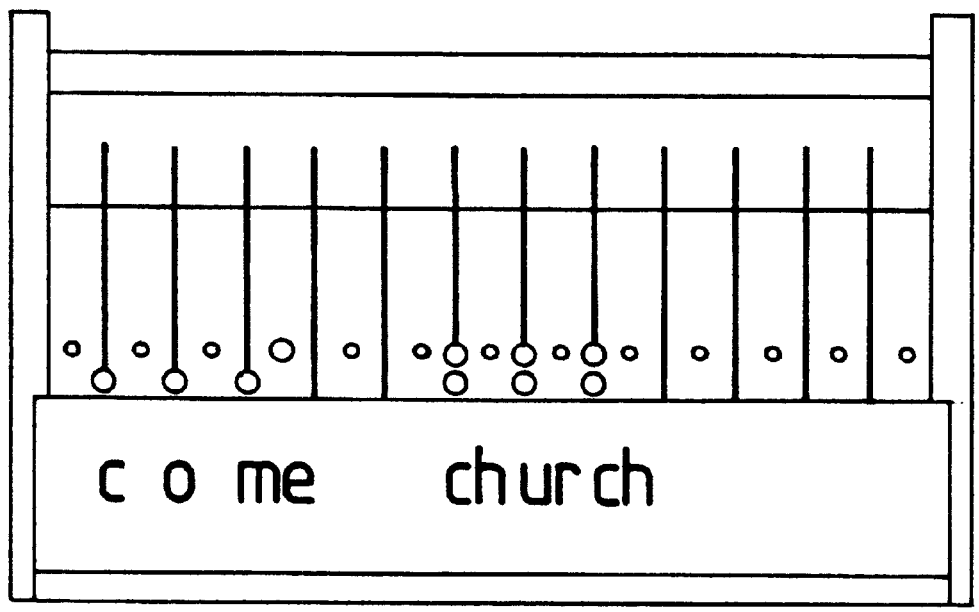
FIG. 4 illustrates the device of FIG. 1 in which the words "COME" and "CHURCH" have been represented and FIG. 5 illustrates the device of FIG. 5 in which the number 352.4 has represented.

In FIG. 4, the device represents the words "COME" and "CHURCH". Again, it can be seen that the arrangement of the balls provides a clear visual indication as to the number of phenomes, the number of silent letters, and the number of letters which make up each phoneme.

The device may further include means for separating the phonemes rods to indicate syllables. The device may include a set of syllable markers which can extend across one to six rods. The syllable markers can be magnetic so that they can magnetically attach to the rods as required.

Figure 5:
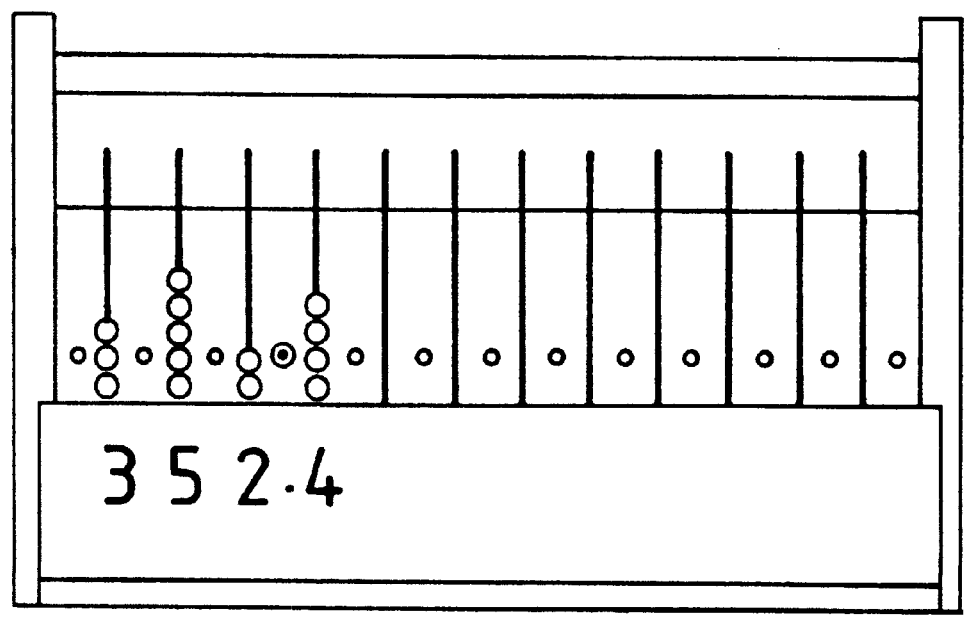

The device of the present invention may also be used to illustrate numeracy values. Each rod, instead of representing a single phenome, could represent a respective unit such as 10s, 100s, or 1000s. The number of balls on a particular rod could be used to represent the value of a particular unit. The contrasting color balls used to represent silent letters may instead be used to represent decimal points. FIG. 5 illustrates the device of FIG. 5 being used to represent the number 352.4.

It can be seen that the device of the present invention can provide an interactive focal point for instruction. It allows children to make a model of the spoken word broken into phonemes, to choose a letter or letters to match a sound, to record the choice of spelling and judge its correctness. The written response on the white board and the ball groupings are able to be changed quickly.

The device also provides the student with a place to "keep" the sounds he or she may think of when attempting to spell a word. This allows the student to focus on choice of letters while a sound is being held by the balls. The device may assist in guiding a student to reflect on sounds within a word, to voice sounds, to match sounds to respective rods and then the letters, and to apply the rules of spelling. Further, the device of the present invention is able to be manipulated quickly and easily to change the words which are being represented.

It will be appreciated that various modifications may be made to the embodiments described and claimed herein, without departing from the spirit and scope of the invention.

What is claimed is:

1. An educational device for visually modelling at least one word wherein the device includes a plurality of display zones, each display zone having a plurality of icons herein each icon is movable between a non display position and a display position in the display zone, wherein each display zone with an icon therein corresponds to a phoneme in the at least one word and the number of icons in each respective display zone represents the number of letters in the respective phoneme.

2. The device of claim 1, wherein each display zone includes up to ten icons.

3. The device of claim 2, wherein the display zones include a vertical rod upon which icon are slidably mounted.

4. The device of claim 3, wherein the icons are balls.

5. The device of claim 1, wherein the display zone includes an inverted U-shaped rod and a partition located between front and rear arms of the rod and the display position is located on the front arm of the rod and the non display position is located on the rear arm.

6. The device of claim 5, wherein the device further includes a surface upon which the at least one word is illustrated.

7. The device of claim 1, wherein the device further includes a plurality of secondary display zones, each secondary display zone having a plurality of secondary icons, wherein each secondary icon is movable between a non display position and a display position in the secondary display zone wherein the secondary icons represent silent letters or punctuation marks in the at least one word.

8. The device of claim 7, wherein the secondary icons are of a contrasting colour to the icons.

9. The device of claim 7, wherein the device further includes a surface upon which the at least one word is illustrated.

10. The device of claim 1, wherein the device further includes a surface upon which the at least one word is illustrated.

11. A method of modelling at least one word, the method including visually representing each phoneme of the at least one word as a discrete collection of at least one icon, wherein the number of icons in each collection is selected based on the number of letters in each respective phoneme.

12. The method of claim 11, wherein the method further includes visually representing each silent letter or punctuation mark in the at least one word with a secondary icon.

13. The method of claim 12, wherein the method further includes visually representing the phonemes of the at least one word adjacent the respective discrete collections of at least one icon.

14. The method of claim 11, wherein the method further includes visually representing the phonemes of the at least one word adjacent the respective discrete collections of at least one icon.

* * * * *